(12) United States Patent
Lee et al.

(10) Patent No.: US 7,961,453 B2
(45) Date of Patent: Jun. 14, 2011

(54) MULTILAYER CHIP CAPACITOR

(75) Inventors: Byoung Hwa Lee, Gyunggi-do (KR);
Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyeonggi-Do (KR)

( * ) Notice: Subject to any disclaimer, the term of this patent is extended or adjusted under 35 U.S.C. 154(b) by 258 days.

(21) Appl. No.: 12/003,884

(22) Filed: Jan. 3, 2008

(65) Prior Publication Data

US 2008/0165469 A1    Jul. 10, 2008

(30) Foreign Application Priority Data

Jan. 9, 2007   (KR) .................. 10-2007-0002635
Dec. 7, 2007   (KR) .................. 10-2007-0126771

(51) Int. Cl.
*H01G 4/228*   (2006.01)
*H01G 4/005*   (2006.01)
*H01G 4/06*    (2006.01)

(52) U.S. Cl. ............... 361/306.3; 361/303; 361/321.2

(58) Field of Classification Search ........... 361/306.3, 361/303, 305, 306.2, 306.1, 309, 321.3, 321.2, 361/311
See application file for complete search history.

(56) References Cited

U.S. PATENT DOCUMENTS

| | | | | |
|---|---|---|---|---|
| 3,444,436 A | * | 5/1969 | Coda Nello | ............... 361/773 |
| 4,590,537 A | * | 5/1986 | Sakamoto | ............... 361/306.3 |
| 4,831,494 A | * | 5/1989 | Arnold et al. | ............... 361/306.3 |
| 5,369,545 A | * | 11/1994 | Bhattacharyya et al. | .. 361/306.2 |
| 5,880,925 A | | 3/1999 | DuPre et al. | |
| 6,292,351 B1 | * | 9/2001 | Ahiko et al. | ............... 361/306.3 |
| 6,441,459 B1 | | 8/2002 | Togashi et al. | |
| 6,768,630 B2 | * | 7/2004 | Togashi | ............... 361/306.1 |
| 6,914,767 B2 | * | 7/2005 | Togashi et al. | ............... 361/303 |
| 6,950,300 B2 | * | 9/2005 | Sutardja | ............... 361/306.3 |
| 6,995,967 B2 | * | 2/2006 | Togashi et al. | ............... 361/303 |

(Continued)

FOREIGN PATENT DOCUMENTS

JP    2002-289467    10/2002

(Continued)

OTHER PUBLICATIONS

Korean Office Action issued in Korean Patent Application No. KR 10-2009-0012364, dated Mar. 20, 2009.

(Continued)

*Primary Examiner* — Eric Thomas
*Assistant Examiner* — David M Sinclair
(74) *Attorney, Agent, or Firm* — McDermott Will & Emery LLP

(57) ABSTRACT

A multilayer chip capacitor including: a capacitor body formed of a lamination of a plurality of dielectric layers and having a bottom surface that is a mounting area; a plurality of internal electrodes disposed to be opposite to each other, interposing a dielectric layer there between in the capacitor body and having one lead extended to the bottom surface, respectively; and three or more external electrodes formed on the bottom surface and connected to corresponding internal electrodes via the leads, wherein the internal electrodes are vertically disposed on the bottom surface, and the leads of the internal electrodes having a different polarity from each other, adjacent to each other in a lamination direction, are disposed to be always adjacent to each other in a horizontal direction.

16 Claims, 15 Drawing Sheets

U.S. PATENT DOCUMENTS

| | | | |
|---|---|---|---|
| 7,023,688 B2 * | 4/2006 | Kazama | 361/321.1 |
| 7,046,500 B2 * | 5/2006 | Lee et al. | 361/303 |
| 7,068,490 B2 * | 6/2006 | Prymak | 361/306.3 |
| 7,280,342 B1 * | 10/2007 | Randall et al. | 361/303 |
| 7,394,645 B2 * | 7/2008 | Takahashi | 361/303 |
| 2003/0231457 A1 | 12/2003 | Ritter et al. | |
| 2004/0184202 A1 * | 9/2004 | Togashi et al. | 361/15 |
| 2007/0041146 A1 | 2/2007 | Togashi | |
| 2007/0103846 A1 * | 5/2007 | Eggerding et al. | 361/306.3 |
| 2007/0109717 A1 | 5/2007 | Lee et al. | |

FOREIGN PATENT DOCUMENTS

| | | |
|---|---|---|
| JP | 2004-040084 | 2/2004 |
| JP | 2006013384 A * | 1/2006 |
| KR | 10-2007-0021967 | 2/2007 |
| KR | 10-2007-0052656 | 5/2007 |

OTHER PUBLICATIONS

Korean Office Action issued in Korean Patent Application No. KR 10-2007-0126771, dated Mar. 6, 2009.

* cited by examiner

MULTILAYER CHIP CAPACITOR

CROSS-REFERENCE TO RELATED APPLICATIONS

This application claims the priorities of Korean Patent Application Nos. 2007-0002635 filed on Jan. 9, 2007 and 2007-0126771 filed on Dec. 7, 2007, in the Korean Intellectual Property Office, the disclosures of which are incorporated herein by reference.

BACKGROUND OF THE INVENTION

1. Field of the Invention

The present invention relates to a multilayer chip capacitor, and more particularly, to a multilayer chip capacitor including internal electrodes vertically disposed on a mounting area and having low equivalent series inductance and appropriate equivalent series resistance.

2. Description of the Related Art

Multilayer chip capacitors are generally used as a decoupling capacitor disposed in a high frequency circuit such as a power supply circuit. There are two types of multilayer chip capacitors, such as a multilayer chip capacitor having internal electrodes disposed vertically to a mounting surface and a multilayer chip capacitor having internal electrodes disposed horizontally to a mounting surface. To stabilize a power supply circuit, a multilayer chip capacitor should have a lower equivalent series inductance (ESL) value. This requirement is more increased according to a tendency where high frequency and high current are required in electronic apparatuses. Stability of a power supply circuit depends on an ESL of a multilayer chip capacitor, and particularly, the stability is high at a low ESL. Also, the stability of the power supply circuit depends on not only the ESL of the multilayer chip capacitor but also equivalent series resistance (ESR). When ESR is too small, the power supply circuit lacks stability and a voltage drops sharply. Accordingly, it is important to keep ESR to be suitable.

To reduce ESL, U.S. Pat. No. 5,880,925 discloses a method where leads of a first internal electrode and second internal electrode, which have an opposite polarity to each other, are disposed in an interdigitated arrangement. However, according to the method, since resistances occurring in four leads of the respective internal electrodes are connected to each other in parallel, resistance of an overall capacitor becomes very low. Accordingly, it is difficult to satisfy a target impedance and instability of a power supply circuit is caused.

To prevent ESR from being too low, U.S. Pat. No. 6,441,459 discloses a method where only one lead is used in one internal electrode. However, according to the method, in a boundary area between blocks of internal electrode patterns, directions of currents flowing through mutually adjacent internal electrodes are identical to each other. Accordingly, magnetic flux is not canceled between the adjacent internal electrodes and ESL becomes high.

FIGS. 1A and 1B are perspective views illustrating conventional multilayer chip capacitors. Referring to FIG. 1A, a capacitor 10 includes a capacitor body 11 formed of a lamination of a plurality of dielectric layers 11A and 11B and external electrodes 31 to 34 (shown in dotted lines) formed on a mounting surface A of the capacitor body 11. In FIG. 1A, to show the mounting surface A that is a bottom surface, the capacitor 10 is turned upside down. In the capacitor body 11, internal electrodes 12 and 13 are alternately disposed interposing the dielectric layers 11A and 11B therebetween. The respective internal electrodes 12 and 13 have two leads (16 and 18) and (17 and 19) connected to the external electrodes (31 and 33) and (32 and 34), respectively.

Referring to FIG. 1B, a capacitor 20 includes a capacitor body 21 and external electrodes 3a, 3b, 3c, and 3d formed on a top surface and bottom surface thereof. First and second internal electrodes 22 and 23 having a different polarity from each other have four leads (1b, 1c, 1d, and 1e) and (1b', 1c', 1d', and 1e') extended to the top surface and bottom surface, respectively.

According to the capacitors 10 and 20 of FIGS. 1A and 1B, since the leads having a different polarity from each other are adjacently disposed to each other, magnetic fluxes caused by currents flowing through the leads are mutually canceled, thereby reducing ESL. However, since a large number of the leads are connected in parallel, ESR becomes excessively low. Particularly, in the capacitor 20, since an effect of reducing ESL is high but ESR becomes excessively low, it is difficult to embody a stable high frequency power supply circuit in decoupling applications.

SUMMARY OF THE INVENTION

An aspect of the present invention provides a multilayer chip capacitor capable of embodying a low ESL simultaneously with having a suitable ESR.

According to an aspect of the present invention, there is provided a multilayer chip capacitor including: a capacitor body formed of a lamination of a plurality of dielectric layers and having a bottom surface that is a mounting area; a plurality of internal electrodes disposed to be opposite to each other, interposing a dielectric layer therebetween in the capacitor body and having one lead extended to the bottom surface, respectively; and three or more external electrodes formed on the bottom surface and connected to corresponding internal electrodes via the leads, wherein the internal electrodes may be vertically disposed on the bottom surface, and the leads of the internal electrodes having a different polarity from each other, adjacent to each other in a lamination direction, may be disposed to be always adjacent to each other in a horizontal direction.

The external electrodes having different polarities may be alternately disposed on the bottom surfaces, and the leads extended to the bottom surface may be disposed in a zigzag arrangement along the lamination direction.

The capacitor may be a 4-terminal capacitor. In this case, six internal electrodes sequentially disposed in the lamination direction may form one block, and the block may be repeatedly laminated.

In the 4-terminal capacitor including the block, first to fourth external electrodes may be sequentially disposed on the bottom surface of the capacitor body, each block may include first to fourth internal electrodes having one lead extended to the bottom surface, respectively, and the leads of the first to fourth internal electrodes may be connected to the first to fourth external electrodes, respectively, the first to fourth internal electrodes may be consecutively disposed in an order of 1st, 2nd, 3rd, 4th, 3rd, and 2nd internal electrodes. Due to such arrangement of the leads, the leads extended to the bottom surface may be disposed in a zigzag arrangement along the lamination direction.

The multilayer chip may further include three or more external electrodes formed on a top surface of the capacitor body. In this case, the respective internal electrodes may further include one lead extended to the top surface and connected to a corresponding external electrode.

The external electrodes having different polarities may be alternately disposed on each of the top and bottom surfaces.

Particularly, the number of the external electrodes formed on the top surface may be identical to the number of the external electrodes formed on the bottom surface, and the external electrodes having different polarities may be disposed to be opposite to each other on the top and bottom surfaces.

The multilayer chip capacitor may be an 8-terminal capacitor. In this case, six internal electrodes consecutively disposed in the lamination direction may form one block and the block may repeatedly laminated.

In the 8-terminal capacitor including the block, first to fourth external electrodes may be sequentially disposed on the bottom surface and fifth to eighth external electrodes may be sequentially disposed on the top surface. Also, each block may include first to fourth internal electrodes, each of the first to fourth internal electrodes including one lead extended to the bottom surface and one lead extended to the top surface. The leads of the first to fourth internal electrodes, extended to the bottom surface, may be connected to the first to fourth external electrodes, respectively. The first to fourth internal electrodes may be consecutively laminated in an order of 1st, 2nd, 3rd, 4th, 3rd, and 2nd internal electrodes in the each block. Due to such arrangement of the leads, the leads extended to the bottom surface may be disposed in a zigzag arrangement along the lamination direction. Similarly, the leads extended to the top surface may be disposed in a zigzag arrangement along the lamination direction.

When the multilayer chip capacitor includes the external electrodes formed on the top and bottom surfaces and the leads connected thereto, internal electrodes of the same polarity among the internal electrodes may be divided into an upper electrode plate and a lower electrode plate in the same plane. All of the internal electrodes may be divided into upper and lower electrode plates in the same plane. The upper and lower electrode plates obtained by dividing the same plane may have a uniform area to each other. On the other hand, the upper and lower electrode plates obtained by dividing the same plane may have a different area from each other.

A width of the capacitor body in the lamination direction may be shorter than a length between two side surfaces parallel to the lamination direction. On the other hand, the width of the capacitor body in the lamination direction may be longer than the length between two side surfaces parallel to the lamination direction.

The multilayer chip capacitor may further include a plurality of external electrodes formed on a top surface of the capacitor body, wherein each of the plurality of internal electrodes further includes one lead extended to the top surface and the external electrodes formed on the top surface are connected to corresponding internal electrodes via the lead extended to the top surface, and all the internal electrodes of the same polarity are electrically connected to one another in the capacitor by the external electrodes.

The external electrodes having different polarities may be alternately disposed on each of the top and bottom surfaces, and the leads extended to each of the top and bottom surfaces may be disposed in a zigzag arrangement along the lamination direction.

The number of the external electrodes formed on the top surface may be identical to the number of the external electrodes formed on the bottom surface. The external electrodes having different polarity may be disposed to face one another on the top and bottom surfaces. In each of the internal electrodes, the lead extended to the bottom surface may be offset by a distance between adjacent external electrodes, from the lead extended to the top surface.

The multilayer chip capacitor may be an 8-terminal capacitor having four external electrodes disposed on the bottom surface and four external electrodes disposed on the top surface, in which first to sixth internal electrodes sequentially disposed in the lamination direction form one block and the block is repeatedly laminated.

First to fourth external electrodes may be sequentially disposed on the bottom surface and fifth to eighth external electrodes may be sequentially disposed on the top surface. Each of the first to sixth internal electrodes may have one lead extended to the bottom surface and one lead extended to the top surface. The leads of the first to fourth internal electrodes extended to the bottom surface may be disposed to be connected to the first to fourth external electrodes, respectively. The lead of the fifth internal electrode extended to the bottom surface may be disposed to be connected to the third external electrode. The lead of the sixth internal electrode extended to the bottom surface may be disposed to be connected to the second external electrode. The leads extended to the top surface may be disposed in a zigzag arrangement in the lamination direction between the fifth external electrode and eighth external electrode as seen from the top surface. Each lead extended to the top surface may be offset by a distance between adjacent external electrodes, from the lead of the same internal electrode extended to the bottom surface.

In the present specification, "bottom surface" of a capacitor body indicates a surface mounted on a circuit board when the capacitor is mounted on the circuit board, and "top surface" of the capacitor body indicates a surface opposite to the bottom surface. Accordingly, when an internal electrode is vertical to the bottom surface, the internal electrode is disposed vertically to a mounting area. Also, "dividing slot" indicates a slit physically dividing the internal electrode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
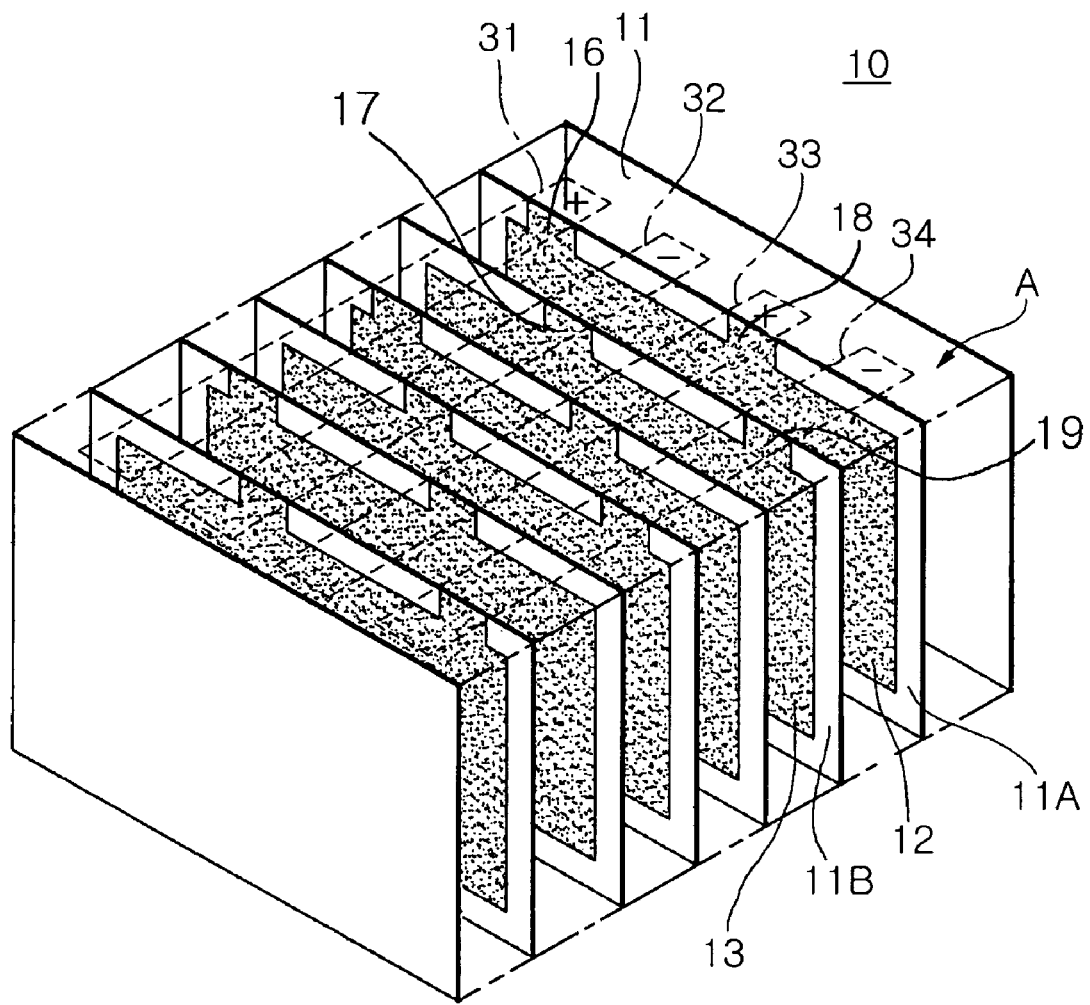
FIGS. 1A and 1B are perspective views illustrating conventional multilayer chip capacitors.
Figure 1B:
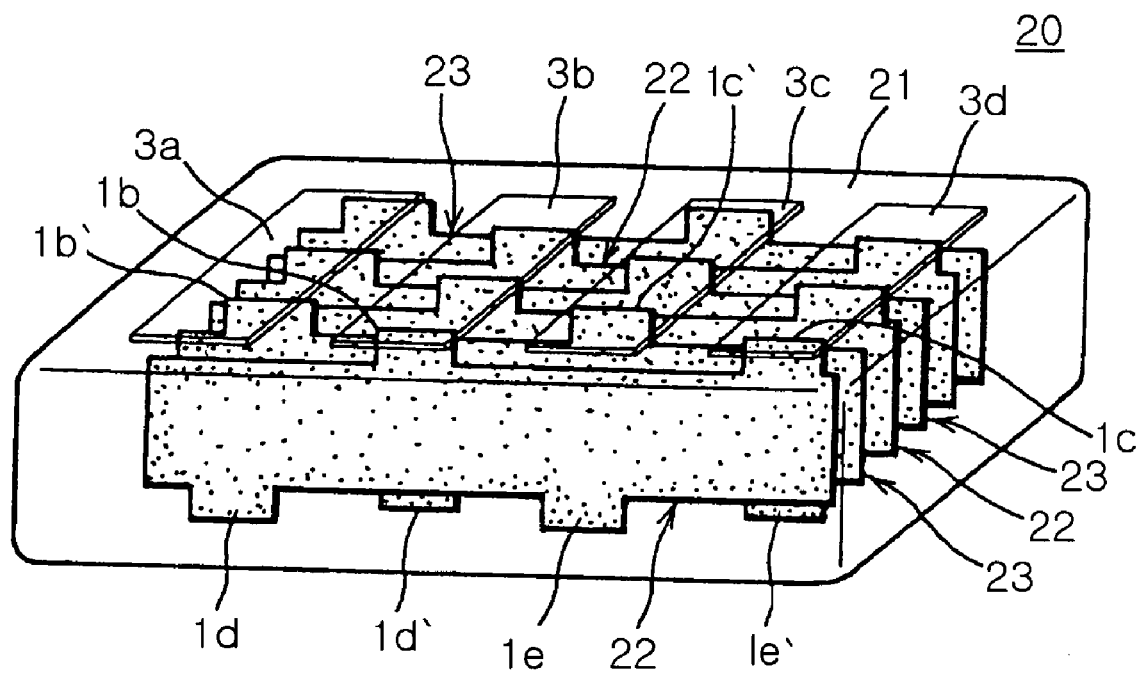

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals are used throughout to designate the same or similar components.

Figure 2:
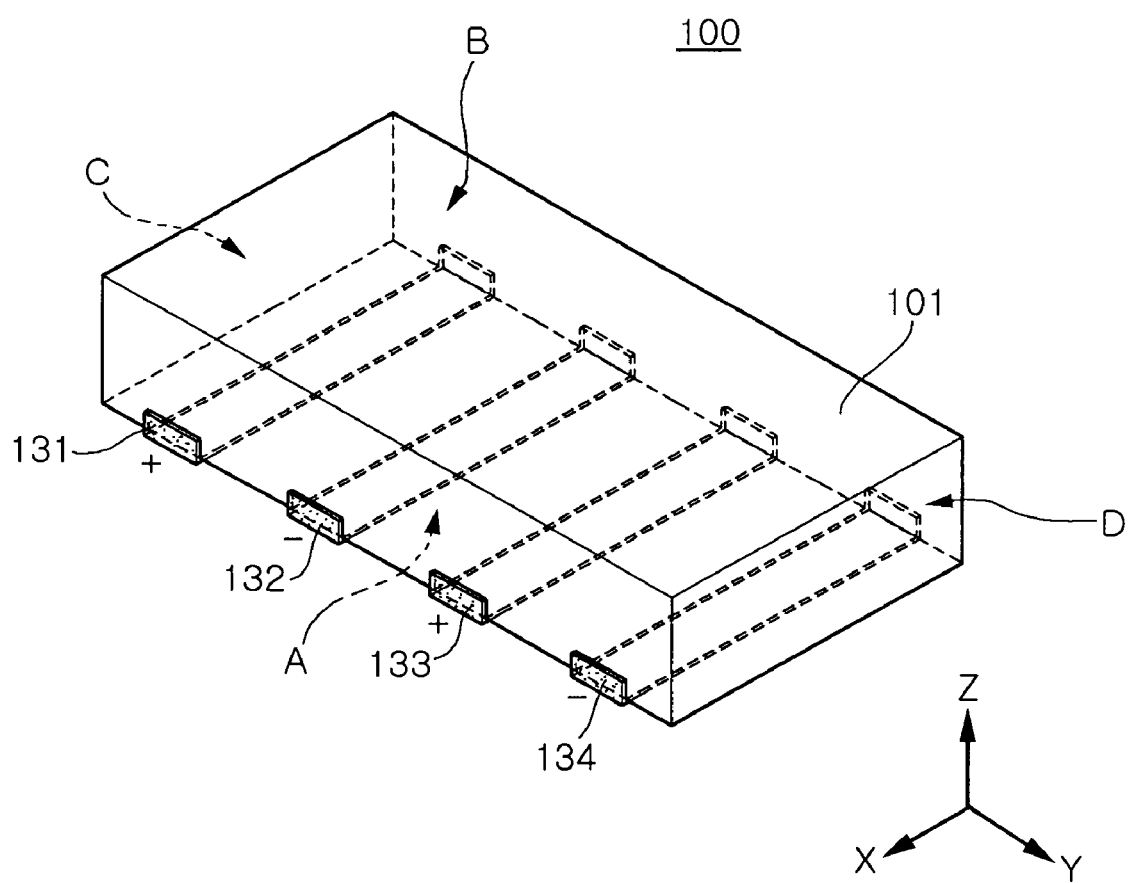
FIG. 2 is a perspective view illustrating an external shape of a multilayer chip capacitor according to an embodiment of the present invention.
Figure 3:
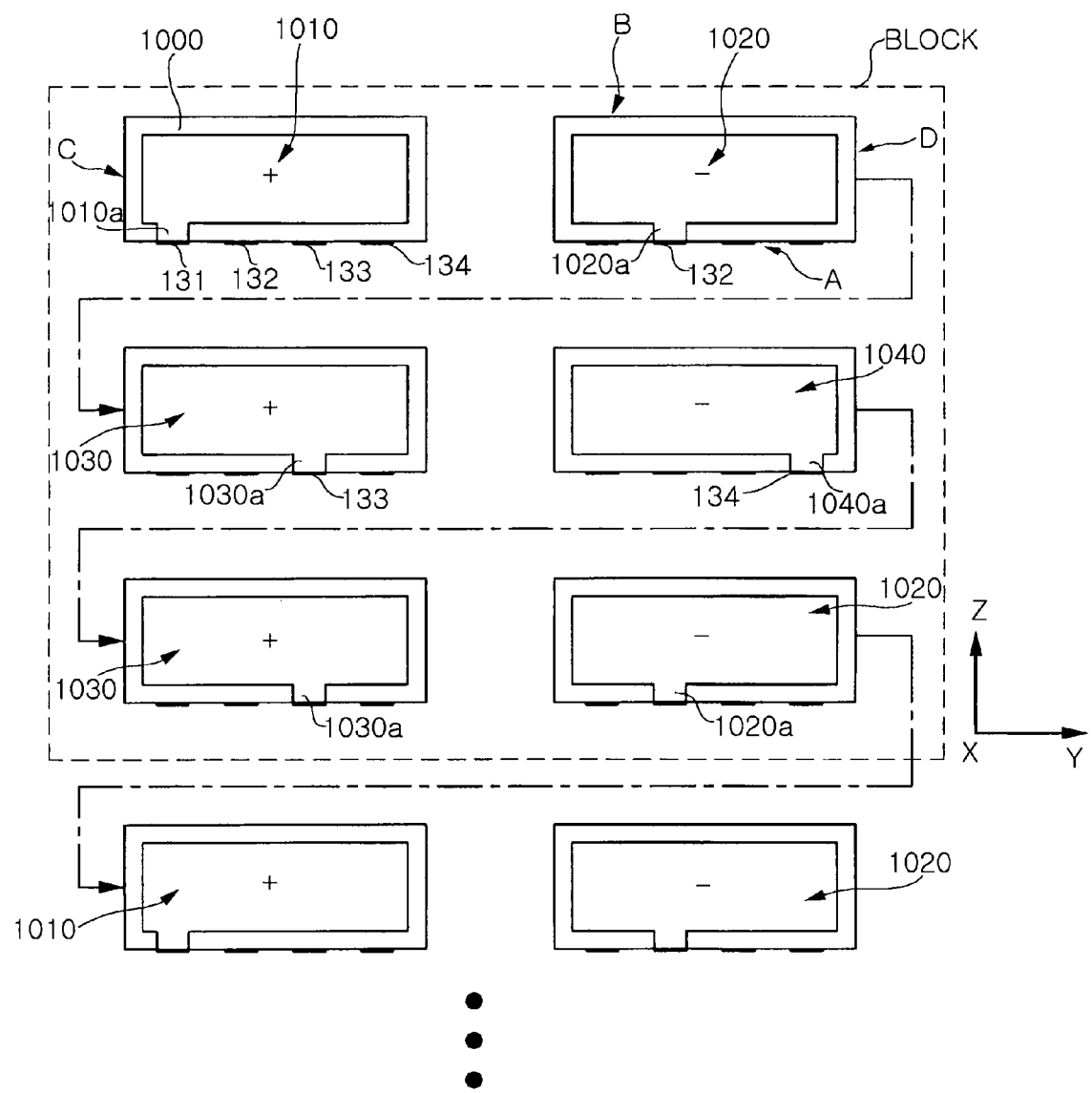
FIG. 3 is a cross-sectional view illustrating internal electrodes disposed in the multilayer chip capacitor of FIG. 2.

FIG. 2 is a perspective view illustrating an external shape of a multilayer chip capacitor 100 according to an embodiment of the present invention, and FIG. 3 is a cross-sectional view illustrating internal electrodes disposed in the multilayer chip capacitor 100 of FIG. 2. The cross-sectional view corresponds to a cross-section cut along a plane where internal electrodes are extended.

Referring to FIGS. 2 and 3, the multilayer chip capacitor 100, which is a 4-terminal capacitor, includes a capacitor 101 formed of a lamination of a plurality of dielectric layers 1000 and first to fourth external electrodes 131 to 134 formed on a bottom surface A of the capacitor body 101, that is a mounting surface. On the bottom surface of the capacitor body 101, the external electrodes 131 to 134 having different polarities from each other are alternately disposed. Also, since the bottom surface A is parallel to a lamination direction that is an X direction, internal electrodes 1010, 1020, 1030, and 1040 are disposed vertically to the bottom surface A. The bottom surface A and a top surface B of the capacitor body 101, and first and second side surfaces C and D are parallel to the lamination direction.

Particularly, the respective internal electrodes 1010, 1020, 1030, and 1040 have only one lead extended to the bottom surface A. Also, leads having a different polarity from each other and adjacent to each other in the lamination direction are disposed to be always adjacent to each other over all the internal electrodes. This is to reduce ESL and prevent ESR from being excessively reduced. A dashed dotted line shown in FIG. 3 is extended in the lamination direction.

An internal structure of the capacitor 100 will be described in detail. Six of the internal electrodes 1010, 1020, 1030, 1040, 1030, and 1020 consecutively laminated form one block. The block is a unit of a periodical structure and is repeatedly laminated. That is, a lead 1010a of the first internal electrode 1010 is connected to the first external electrode 131, a lead 1020a of the second internal electrode 1020 is connected to the second external electrode 132, a lead 1030a of the third internal electrode 1030 is connected to the third external electrode 133, and a lead 1040a of the fourth internal electrode 1040 is connected to the fourth external electrode 134. Accordingly, according to a lamination order of 1st, 2nd, 3rd, 4th, 3rd, and 2nd internal electrodes, six of four types of electrode patterns, that is, the first to fourth internal electrodes are laminated, thereby forming one block. The block is repeatedly laminated along the lamination direction.

According to an arrangement of the leads of the internal electrodes as described above, the leads having a different polarity are always adjacent to each other. The leads having a different polarity and adjacent to each other allow currents to flow in mutually opposite directions, thereby canceling magnetic flux and reducing ESL. Also, the respective internal electrodes include only one lead, thereby preventing excessive reduction of ESR.

Figure 4A:
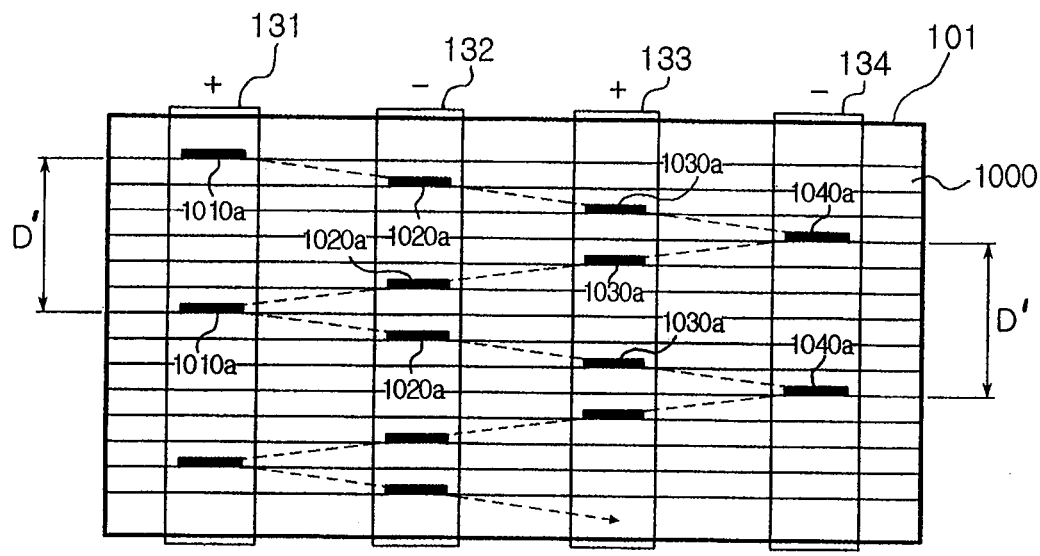
FIG. 4A is a bottom view illustrating an arrangement of leads extended to a bottom surface of the multilayer chip capacitor of FIG. 2.

In addition, as shown in FIG. 4A, since the leads extended to the bottom surface are disposed in a zigzag arrangement (refer to a dotted line), a distance D' between adjacent leads connected to the same external electrode becomes relatively great. For example, a distance D' between the leads 1010a adjacent in the lamination direction and connected to the external electrode 131 corresponds to a thickness of six dielectric layers. Accordingly, a mutual inductance due to magnetic coupling between the leads of the same polarity and adjacent in the lamination direction, that is, the X direction, is reduced, thereby reducing ESL.

Figure 4B:
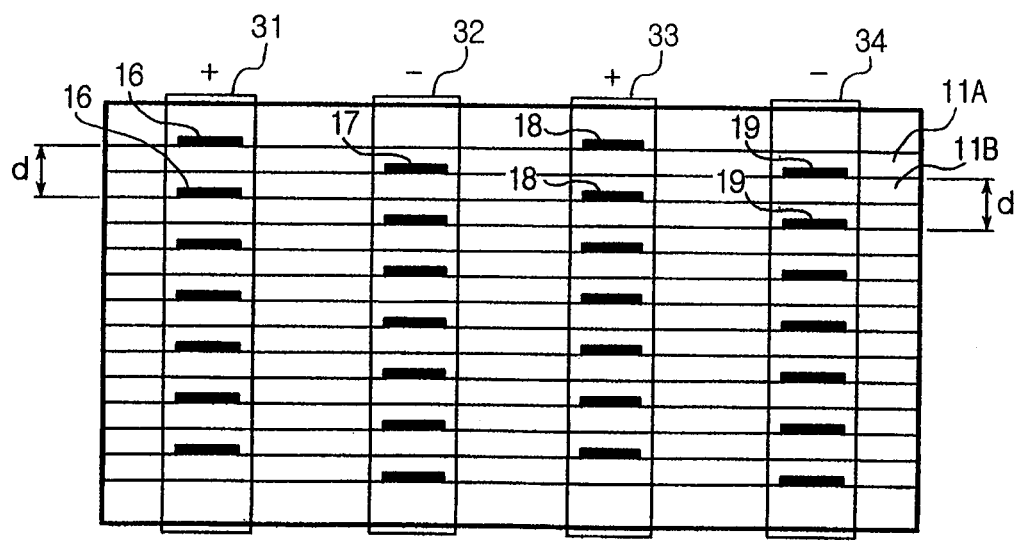
FIG. 4B is a bottom view illustrating an arrangement of leads extended to a bottom surface of the multilayer chip capacitor of FIG. 1A.

On the other hand, as shown in FIG. 4B, in the case of a conventional capacitor (refer to FIG. 1A), since a distance between adjacent leads 16 connected to the same external electrode 31 corresponds to a thickness d of just two dielectric layers, a relatively high mutual inductance occurs between leads of the same polarity and adjacent in a lamination direction.

Figure 5:
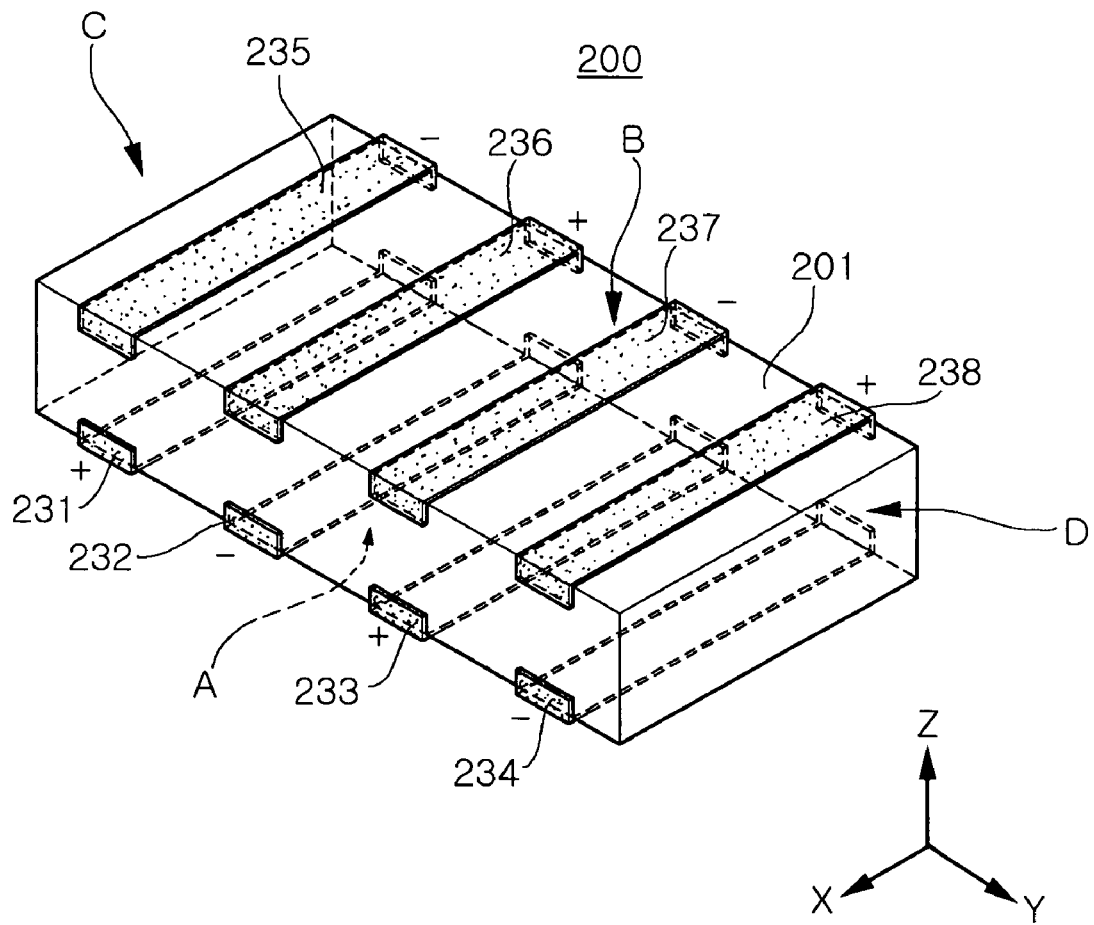
FIG. 5 is a perspective view illustrating an external shape of a multilayer chip capacitor according to another embodiment of the present invention.
Figure 6:
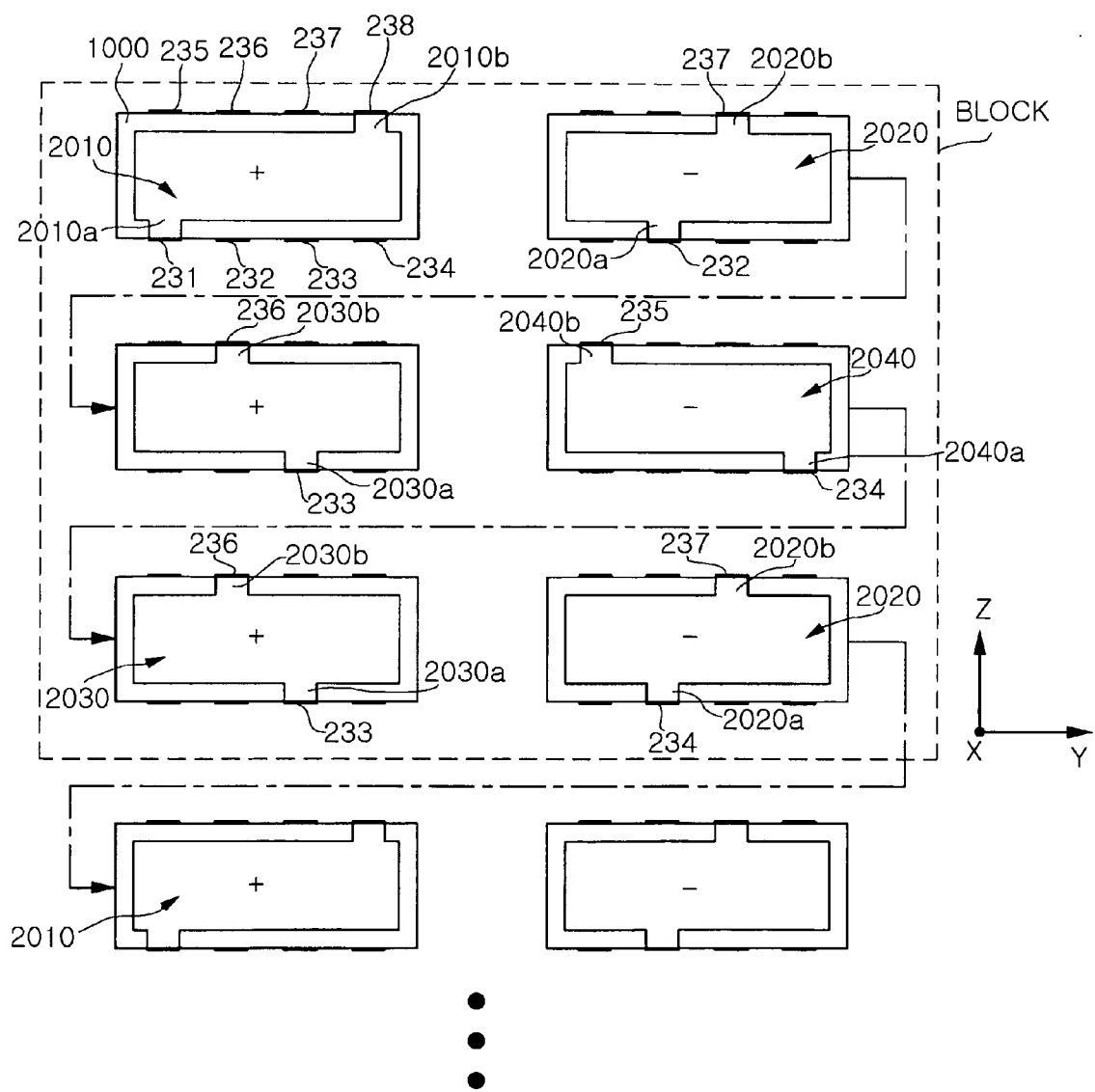
FIG. 6 is a cross-sectional view illustrating internal electrodes disposed in the multilayer chip capacitor of FIG. 5.

FIG. 5 is a perspective view illustrating an external shape of a multilayer chip capacitor 200 according to another embodiment of the present invention, and FIG. 6 is a cross-sectional view illustrating internal electrodes disposed in the capacitor 200. Referring to FIG. 5, the capacitor 200 includes external electrodes 231 to 234 formed on a bottom surface A of a capacitor body 201 and further includes four external electrodes 235 to 238 formed on a top surface B. The capacitor 200 is an 8-terminal capacitor.

In the present embodiment, to connect internal electrodes 2010, 2020, 2030, and 2040 to corresponding external electrodes 231 to 238 on the bottom surface A and top surface B, the internal electrodes 2010, 2020, 2030, and 2040 have one lead extended to the bottom surface A and one lead extended to the top surface B. Also, in the present embodiment, the leads extended to the bottom surface A are disposed in a zigzag arrangement along a lamination direction, that is, an X direction (refer to FIG. 4A). In addition, the leads extended to the top surface B are disposed in a zigzag arrangement along a lamination direction, that is, the X direction, which is known from FIG. 6.

In detail, leads 2010a and 2010b of the first internal electrode 2010 are connected to the first external electrode 231 and the eighth external electrode 238, leads 2020a and 2020b of the second internal electrode 2020 are connected to the second external electrode 232 and the seventh external electrode 237, leads 2030a and 2030b of the third internal electrode 2030 are connected to the third external electrode 233 and the sixth external electrode 236, and leads 2040a and 2040b of the fourth internal electrode 2040 are connected to the fourth external electrode 234 and the fifth external electrode 235, respectively. Such the first to fourth internal electrodes are consecutively disposed in an order of 1st, 2nd, 3rd, 4th, 3rd, 2nd internal electrodes, thereby forming one block. The block is repeatedly laminated.

In the embodiment of FIGS. 5 and 6, due to an arrangement where leads having a different polarity are disposed adjacently to each other in the zigzag arrangement, ESL may be reduced. Since the respective internal electrodes include only one lead extended to each of the top and bottom surfaces, excessive reduction of ESR may be prevented.

Figure 7:
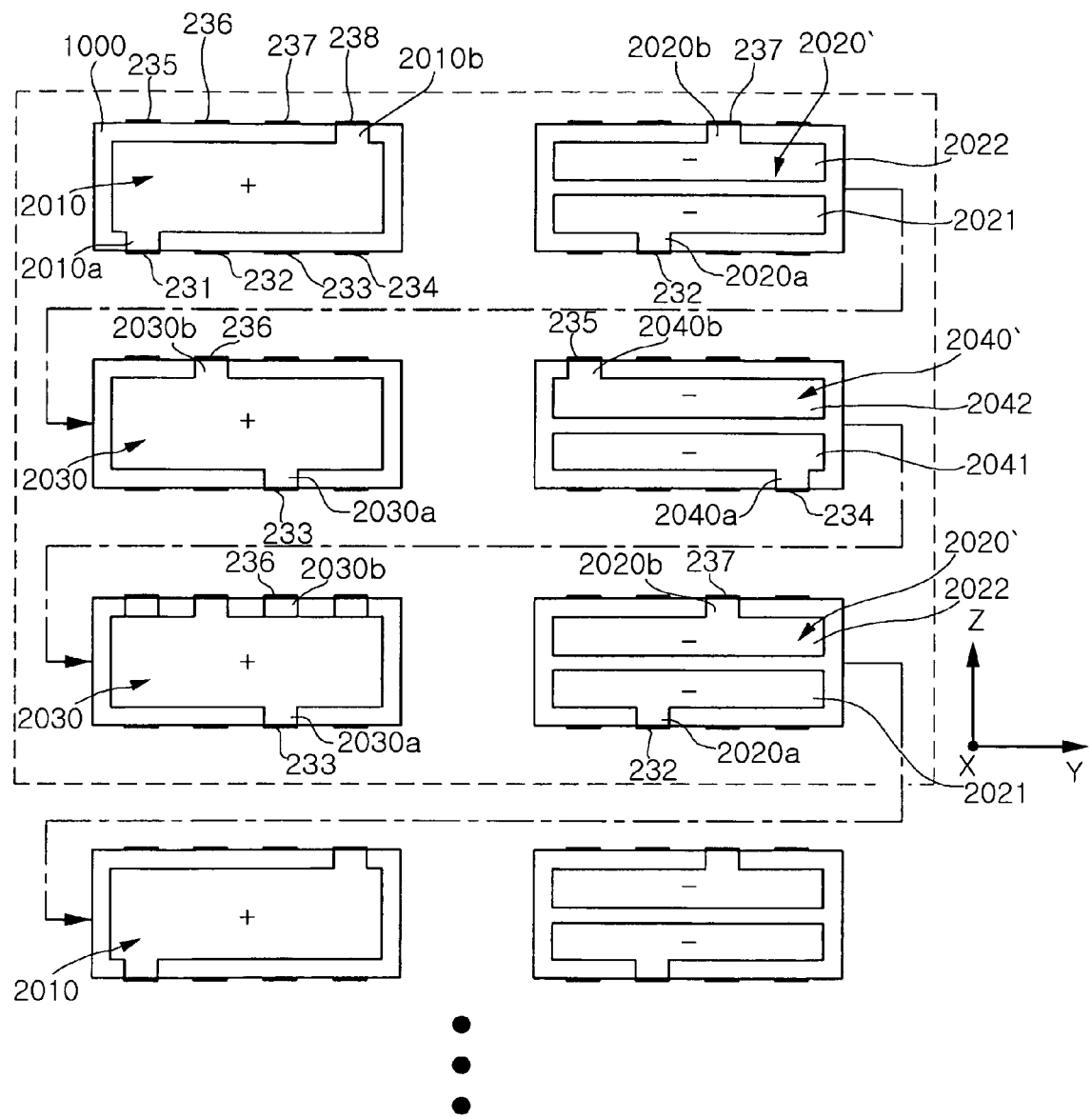
FIG. 7 is a cross-sectional view illustrating another example of internal electrodes disposed in the multilayer chip capacitor of FIG. 5.

FIG. 7 illustrates a modified example of the internal electrode arrangement structure of FIG. 6. In FIG. 7, particularly, each of the internal electrodes of the same polarity, which is a negative polarity forming a ground potential in this case, are divided into an upper electrode plate and a lower electrode plate. Referring to FIG. 7, instead of the second and fourth internal electrodes 2020 and 2040 of FIG. 6, internal electrodes 2020' and 2040' divided by a dividing slot parallel to a Y direction are used. As described above, the internal electrodes 2020' and 2040' of the same polarity are divided into upper and lower electrode plates (2022 and 2021) and (2042 and 2041), respectively. Therefore two divided capacitors in a single chip can be used by connecting each other in parallel. Others of the internal electrode structure and external electrode structure are identical to those of FIG. 6.

Figure 8:
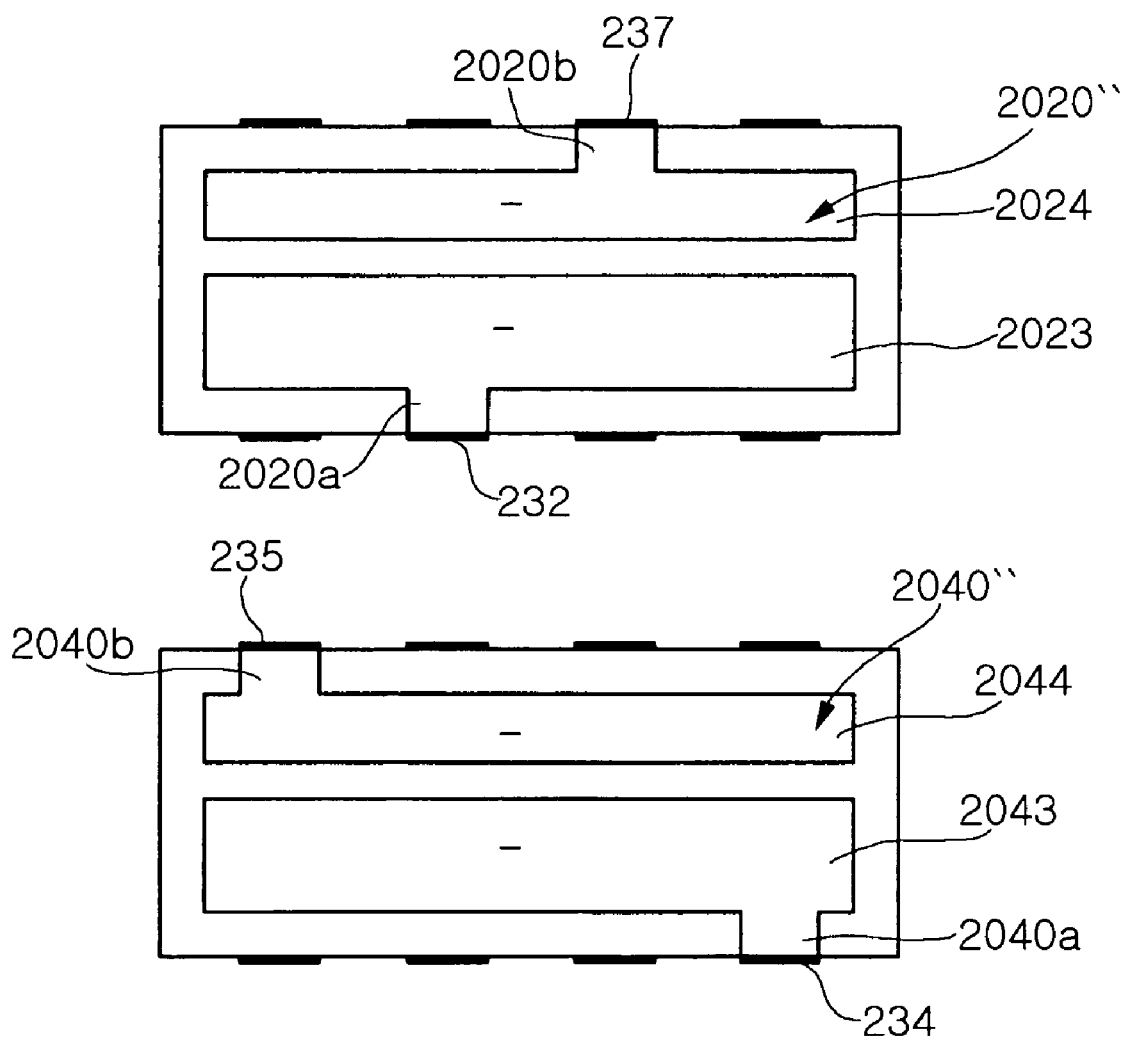
FIG. 8 is a cross-sectional view illustrating still another example of internal electrodes disposed in the multilayer chip capacitor of FIG. 5.

FIG. 8 illustrates a modified example of FIG. 7. In FIG. 8, particularly, upper and lower electrode plates (2024 and 2023) and (2044 and 2043) on the same plane of divided internal electrodes 2020" and 2040" of the same polarity, which is a negative polarity in this case, have a different area from each other. As described above, internal electrodes are divided on the same plane into different areas, thereby making a difference between capacitances of the respective electrode plates. When 'mutually divided capacitors' disposed in the same chip structure have mutually different capacitances, a low impedance may be generated in a broader frequency range, as follows (refer to FIG. 9). Other of the internal electrode structure and outer structure are identical to those of FIG. 6.

Figure 9:
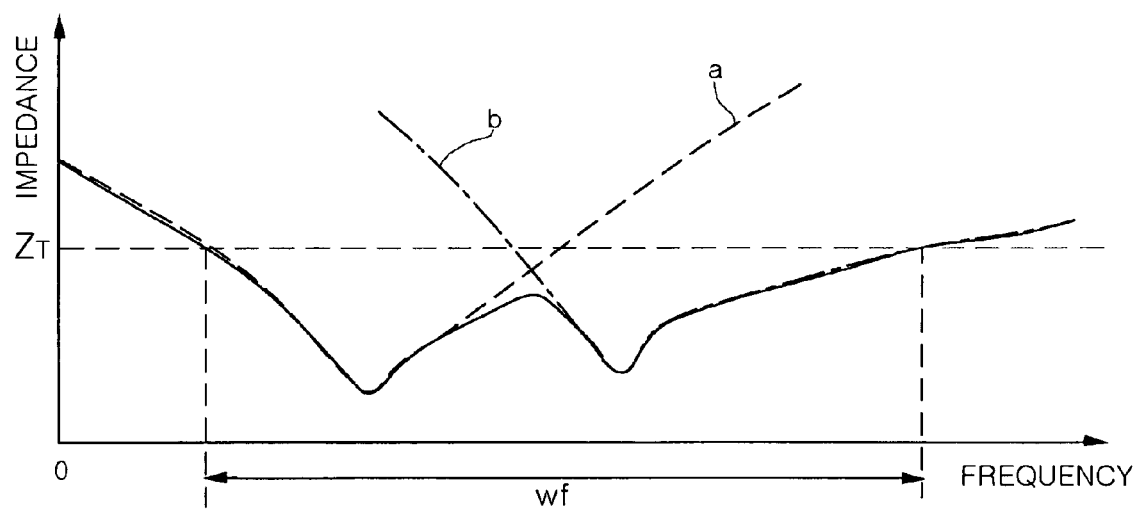
FIG. 9 is a graph briefly illustrating a change in impedance according to a frequency of the multilayer chip capacitor of FIG. 8.

FIG. 9 is a graph illustrating impedance and frequency of a capacitor having the internal electrode structure of FIG. 8. Among electrode plates having mutually different areas, a dotted curve a indicates an impedance curve of the capacitor, generated by an electrode plate having a larger area, and a dashed dotted curve b indicates an impedance curve of the capacitor, generated by an electrode plate having a smaller area. An impedance curve that is a solid curve in FIG. 9 is shown by mixing the two impedance curve. As described above, a frequency range wf indicating an impedance lower than a target impedance $Z_T$ is larger than a frequency range less than the target impedance $Z_T$ at the respective curves a and b. This indicates that a power supply circuit stable in a larger frequency range may be embodied.

Figure 10:
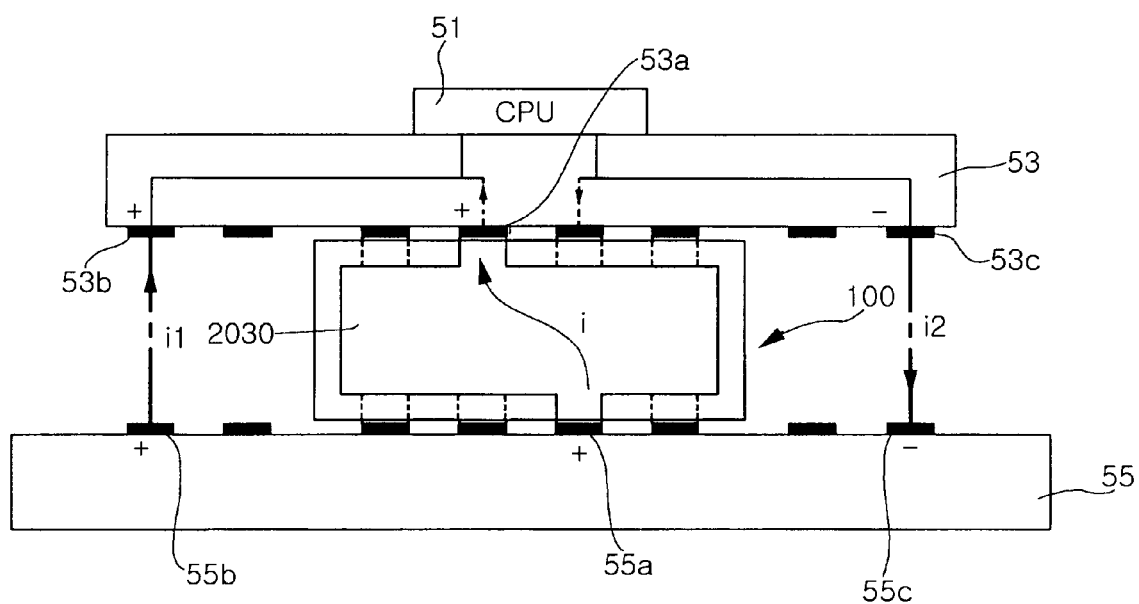
FIG. 10 is a schematic diagram illustrating an example of using the multilayer chip capacitor according to an exemplary embodiment of the present invention as a decoupling capacitor.

When the capacitor according to the embodiment of FIG. 6 is used as a decoupling capacitor of a power supply circuit of a large-scale integration (LSI) circuit of a central processing unit (CPU), the capacitor may operate as a feedthrough type capacitor. That is, as shown in FIG. 10, when the capacitor 100 of FIG. 6 is mounted and used as a decoupling capacitor between a circuit board 53, for example, a CPU package where a CPU 51 is loaded, and a motherboard 55, power supply current i may flow through between a power supply terminal 55a of the motherboard 55 and a power connection terminal 53a of the CPU Package 53 via internal electrodes. Accordingly, in addition to a current i1 from another power supply terminal 55b through terminal 53b and a current i2 through terminal 53c to a ground terminal 55c, the current i flowing through the internal electrodes is additionally provided. The number of paths where a current flowing through the CPU package is increased, thereby reducing a loss of power of the CPU package, which is emitted as heat.

Figure 11:
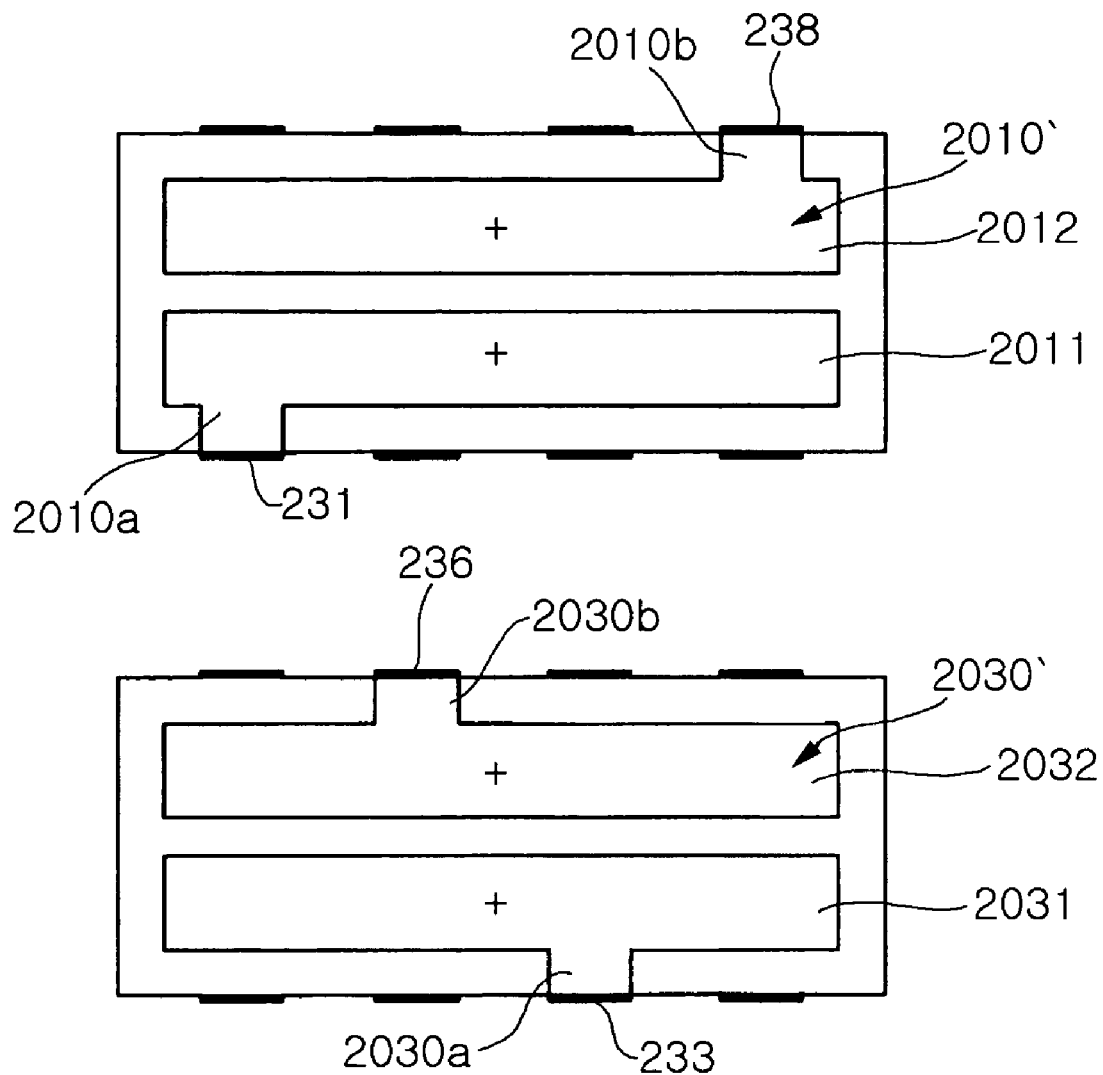
FIG. 11 is a cross-sectional view illustrating yet another example of internal electrodes disposed in the multilayer chip capacitor of FIG. 5.

FIG. 11 is a modified example of the capacitor of FIG. 6. Opposite to FIG. 7, internal electrodes 2010' and 2030' of a positive polarity are divided into upper and lower electrode plates (2012 and 2011) and (2032 and 2031) on the same plane by a dividing slot. All of internal electrodes of positive and negative polarities may be divided into upper and lower electrode plates on the same plane.

Figure 12:
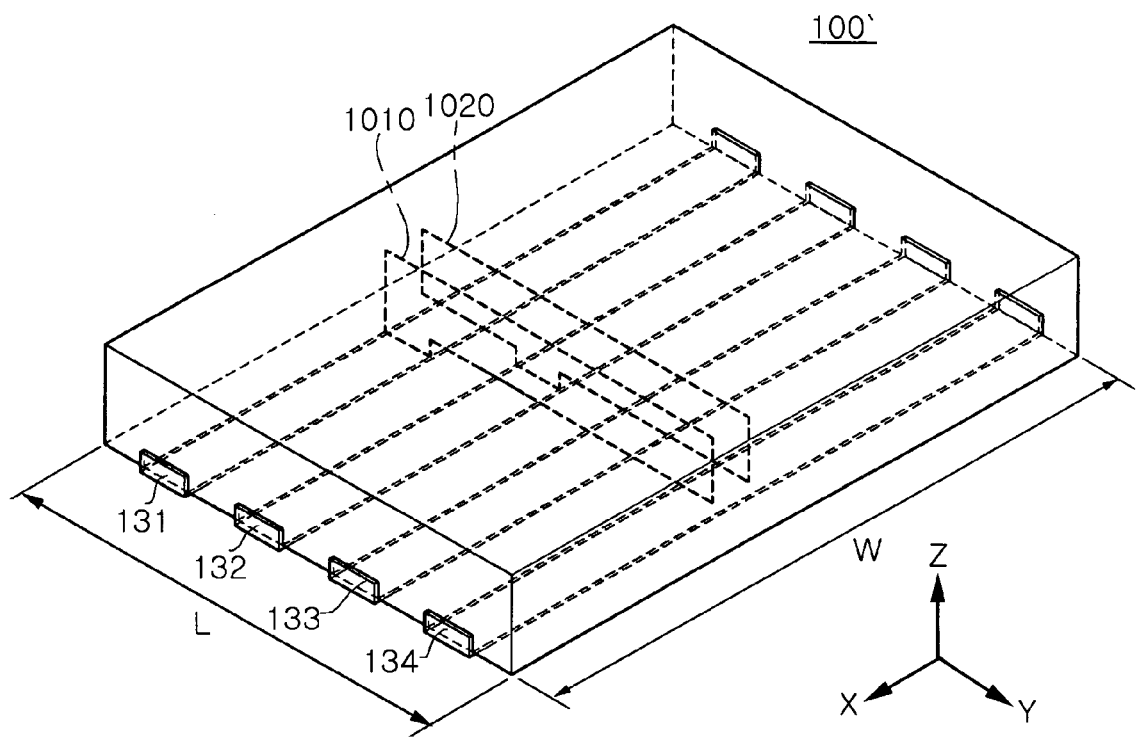
FIG. 12 is a perspective view illustrating an external shape of a multilayer chip capacitor according to still another embodiment of the present invention.

FIG. 12 is a multilayer chip capacitor 100' according to still another embodiment of the present invention. Referring to FIG. 12, the multilayer chip capacitor 100' is similar to the capacitor 100 of FIG. 2 except that a width W of a capacitor body in a lamination direction that is an X direction is longer than a length L between two side surfaces parallel to the lamination direction. When external electrodes are disposed on top and bottom surfaces, the width W may be longer than the length L. As described above, the width W is longer than the length L, thereby stably increasing the number of laminations. According to an increase of the number of laminations, ESL is more decreased. Different from a capacitor including internal electrodes horizontally disposed, a current may directly flow from a mounting surface to a lead of an internal electrode without additional current path, regardless of the number of laminations.

Figure 13:
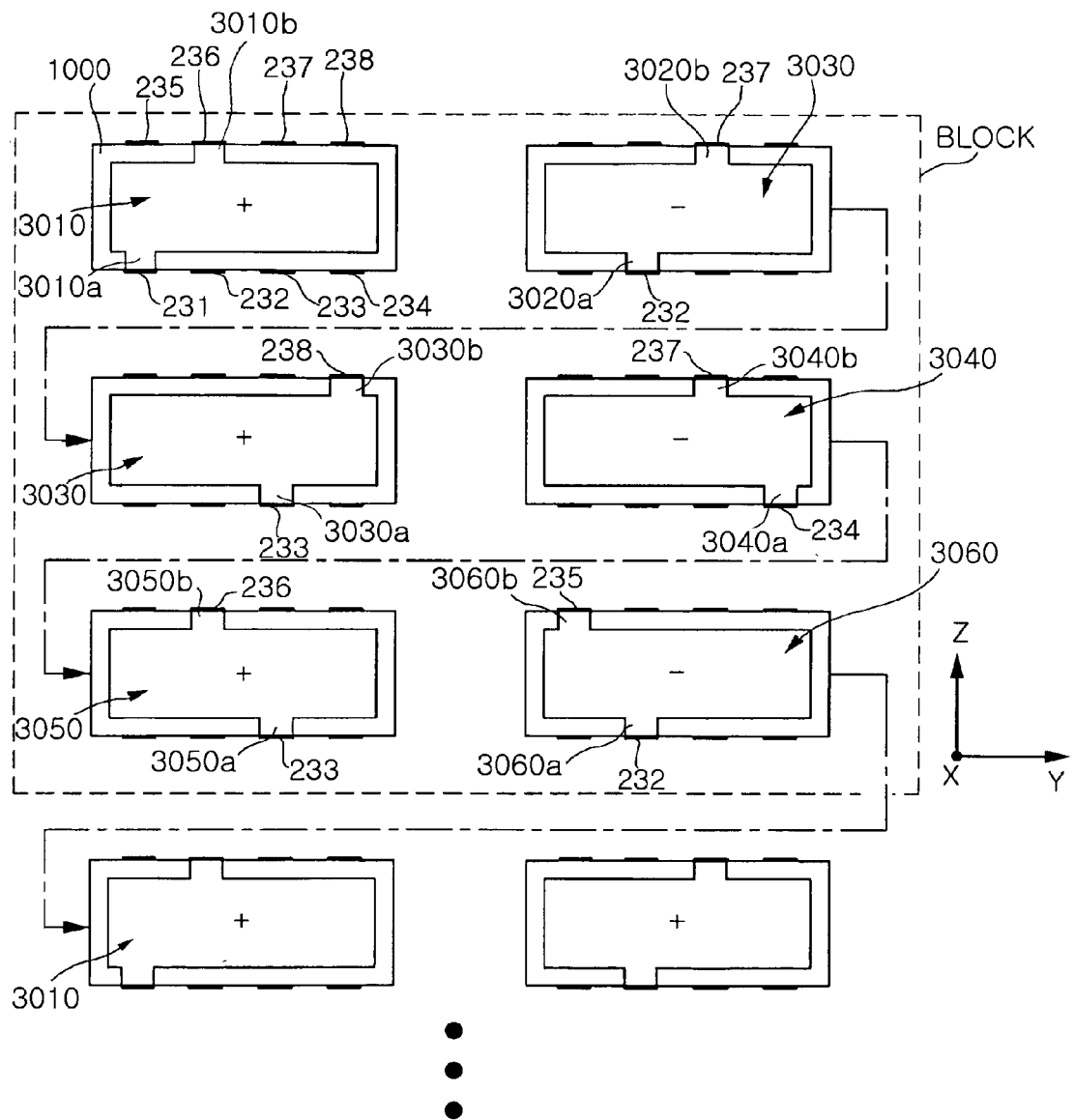
FIG. 13 is a cross-sectional view illustrating a further another example of internal electrodes disposed in the multilayer chip capacitor of FIG. 5.

FIG. 13 is a cross-sectional view illustrating another example of an internal electrode structure. A multilayer chip capacitor of FIG. 13 is an 8-terminal capacitor and has an external shape of the capacitor 200 of FIG. 5. In the present embodiment, all internal electrodes of the same polarity are electrically connected to one another in the capacitor.

Referring to FIG. 13, to connect internal electrodes 3010 to 3060 to corresponding external electrodes 231 to 238, the respective internal electrodes 3010 to 3060 have only one leads 3010a to 3060a extended to a bottom surface and only one leads 3010b to 3060b extended to a top surface. Also; leads adjacent in the lamination direction and having a different polarity, such as 3010a and 3020a, are disposed to be always adjacent through the entire internal electrodes. Such lead arrangement reduces ESL and prevents an excessive decrease of ESR.

Hereinafter, an inner structure of the capacitor of FIG. 13 will be described in detail. The consecutive first to sixth internal electrodes 3010 to 3060 sequentially laminated form one block. The block is repeatedly laminated in the lamination direction (X-direction), as a unit of a periodic structure. The leads 3010a and 3010b of the first internal electrode 3010 are connected to the first external electrode 231 and the sixth external electrode 236, respectively. The leads 3020a and 3020b of the second internal electrode 3020 are connected to the second external electrode 232 and the seventh external electrode 237, respectively. The leads 3030a and 3030b of the third internal electrode 3030 are connected to the third external electrode 233 and the eighth external electrode 238, respectively. The leads 3040a and 3040b of the fourth internal electrode 234 are connected to the fourth external electrode 234 and the seventh external electrode 237, respectively. The leads 3050a and 3050b of the fifth internal electrode 3050 are connected to the third external electrode 233 and the sixth external electrode 236, respectively. The leads 3060a and 3060b of the sixth internal electrode 3060 are connected to the second external electrode 232 and the fifth external electrode 235, respectively.

In FIG. 13, starting from the internal electrode 3010, six consecutive internal electrodes 3010, 3020, 3030, 3040, 3050, and 3060 form the one block (shown in dotted line).

However, a starting point of the block may be arbitrarily determined. For example, one block may be formed by six consecutive internal electrodes 3020, 3030, 3040, 3050, 3060, and 3010, starting from the internal electrode 3020. Regardless of determining which internal electrode as the starting point, one block is formed by six consecutive internal electrodes.

According to the lead arrangement of the internal electrodes as described above, the leads having a different polarity are always adjacent to each other. The adjacent leads having a different polarity allow a current to flow in different directions from each other, thereby canceling magnetic flux and reducing ESL. Also, each of the internal electrodes has only two leads, thereby preventing an excessive decrease of ESR. The leads extended to the top and bottom surface of the capacitor body 210 are disposed in a zigzag arrangement in the lamination direction (refer to FIG. 4A), thereby reducing a mutual inductance in the capacitor.

Also, as shown in FIG. 13, in each of the internal electrodes 3010 to 3060, the lead extended to the bottom surface is offset by a distance between adjacent external electrodes, from the lead extended to the top surface. For example, in the first internal electrode 3010, the lead 3010a extended to the bottom surface is offset by a distance between adjacent external electrodes to the left from the lead 3010b extended to the top surface. The two leads in the offset arrangement are disposed in the zigzag arrangement in the lamination direction, thereby electrically connecting all of the internal electrodes having the same polarity in the capacitor.

For example, the first internal electrode 3010 of a positive polarity is electrically connected to the fifth internal electrode 3050 of a positive polarity via the sixth external electrode 236 connected to the lead 3010b and the fifth internal electrode of a positive polarity is electrically connected to the third internal electrode 3030 via the third external electrode 233 connected to the lead 3050b. Accordingly, all of the internal electrodes having the positive polarity, that is, the first, third, and fifth internal electrodes 3010, 3030, and 3050 are electrically to one another in the capacitor.

Also, the second internal electrode 3020 of a negative polarity is electrically connected to the sixth internal electrode 3060 via the second external electrode 232 connected to the lead 3020a and, additionally, electrically connected to the fourth internal electrode 3040 via the seventh external electrode 236 connected to the lead 3020b. Accordingly, the internal electrodes of a negative polarity, that is, the second, fourth, and sixth internal electrodes 3020, 3040, and 3060 are electrically connected to one another in the capacitor.

It makes an electrostatic capacitance test after manufacturing a capacitor easy that all of the internal electrodes having the same polarity are electrically connected in the capacitor without an electrode pad of a circuit board or external connection element. That is, when all of the internal electrodes having the same polarity are connected to one another in the capacitor, an electrostatic capacitance test of the entire capacitor may be performed by allowing positive and negative probes of an electrostatic capacitance test apparatus to be in contact with only two external electrodes having a different polarity. However, when there is only one internal electrode that is not electrically connected to another internal electrode having the same polarity, to test an entire capacitance of the capacitor, there is a difficulty of mounting the capacitor on an external board having a connection element such as an electrode pad or using another external connection element.

Figure 14:
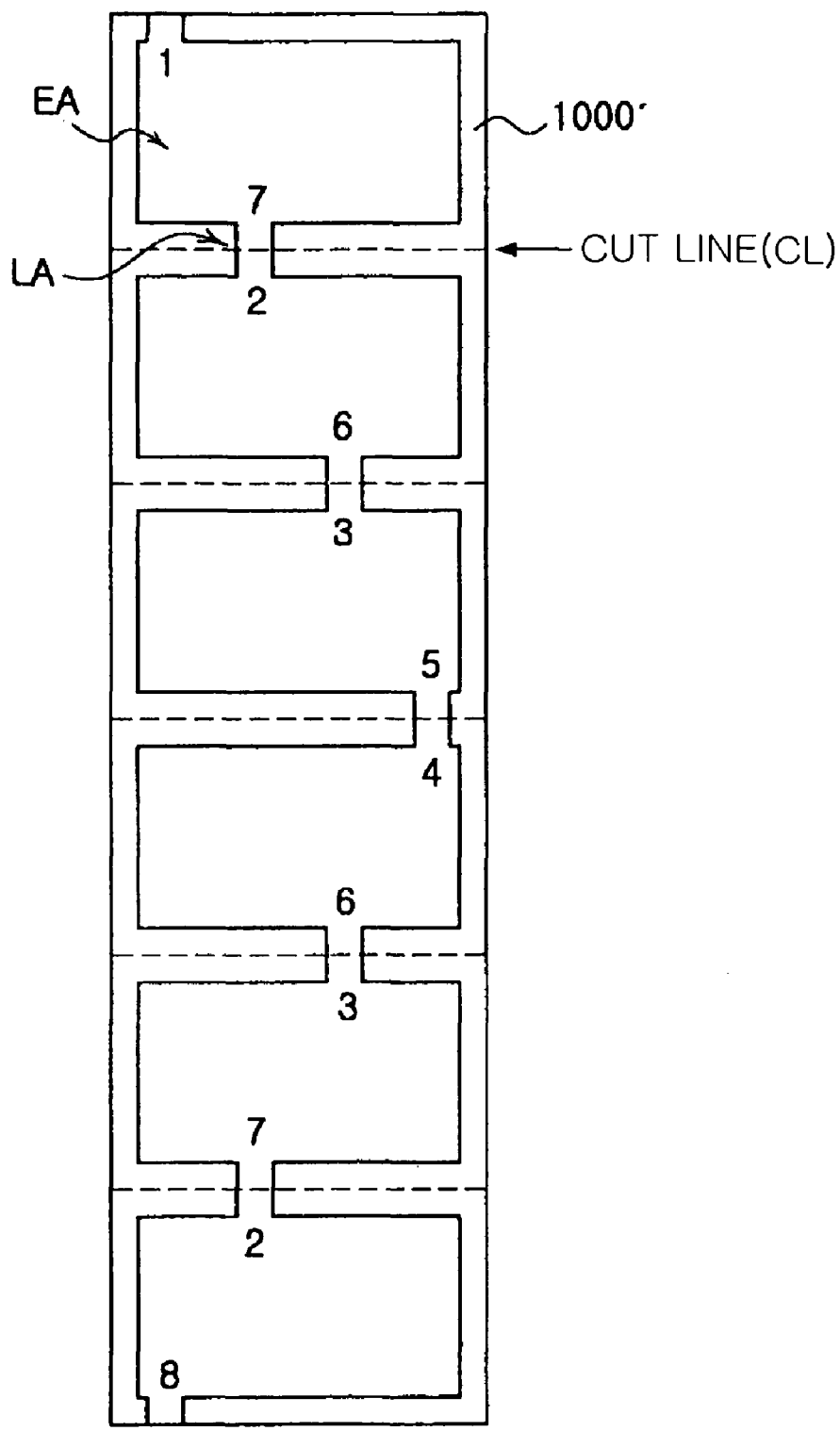
FIG. 14 is a top view illustrating an example of a printed screen pattern for internal electrodes of the capacitor of FIG. 13.

FIG. 14 is a top view illustrating an example of a printed screen pattern for internal electrodes, for the capacitor of FIG. 13. The internal electrodes are formed on an electrode pattern area EA opened by a screen area 1000' on a dielectric layer. By preparing the printed screen pattern as shown in FIG. 14, lead areas of internal electrodes longitudinally adjacent in a lamination direction, for example, a seventh lead area corresponding to the lead 3060a of FIG. 13 and a second lead area corresponding to the lead 3050b of FIG. 13) meet each other. As described above, the lead areas of the longitudinally adjacent internal electrodes meet each other on a layout of the printed screen pattern and form one area LA, thereby basically preventing a problem that a lead is exposed from a corresponding external electrode due to a cutting error when cutting a sheet drawn along a cutting line CL in a manufacturing process.

According to an exemplary embodiment of the present invention, ESL is reduced and excessive reduction of ESR is prevented in a multilayer chip capacitor. Accordingly, when applying the multilayer chip capacitor as a decoupling capacitor, power may be more stably supplied to a high frequency circuit. Also, all of external electrodes having the same polarity are electrically connected without an external connection element in the capacitor, thereby allowing electrostatic capacitance test and measurement to be easily performed.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
   a capacitor body formed of a lamination of a plurality of dielectric layers and having a bottom surface that is a mounting area;
   a plurality of internal electrodes disposed to be opposite to each other, interposing a dielectric layer therebetween in the capacitor body and having a single lead extended to the bottom surface, respectively; and
   three or more external electrodes formed on the bottom surface and connected to corresponding internal electrodes via the leads,
   wherein the internal electrodes are vertically disposed on the bottom surface,
   the leads of the internal electrodes having a different polarity from each other, adjacent to each other in a lamination direction, are disposed to be always adjacent to each other in a horizontal direction,
   the external electrodes having different polarities are alternately disposed on the bottom surface, and
   all of the leads extended to the bottom surface are disposed in a single zigzag line passing the three or more external electrodes along the lamination direction,
   wherein the capacitor is a 4-terminal capacitor, six internal electrodes sequentially disposed in the lamination direction form one block, and the block is repeatedly laminated.

2. The multilayer chip capacitor of claim 1, wherein first to fourth external electrodes are sequentially disposed on the bottom surface of the capacitor body,
   each block comprises first to fourth internal electrodes having a single lead extended to the bottom surface, respectively, and
   the leads of the first to fourth internal electrodes are connected to the first to fourth external electrodes, respectively,
   the first to fourth internal electrodes are consecutively disposed in an order of 1st, 2nd, 3rd, 4th, 3rd, and 2nd internal electrodes.

3. The multilayer chip capacitor of claim 1, wherein a width of the capacitor body in the lamination direction is shorter than a length between two side surfaces parallel to the lamination direction.

4. The multilayer chip capacitor of claim 1, wherein a width of the capacitor body in the lamination direction is longer than a length between two side surfaces parallel to the lamination direction.

5. A multilayer chip capacitor comprising:
a capacitor body formed of a lamination of a plurality of dielectric layers and having a top surface and a bottom surface that is a mounting area;
a plurality of internal electrodes disposed to be opposite to each other, interposing a dielectric layer therebetween in the capacitor body and having a single lead extended to the bottom surface, respectively; and
four external electrodes formed on the bottom surface and connected to corresponding internal electrodes via the leads,
three or more external electrodes formed on a top surface of the capacitor body,
all of the leads extended to the bottom surface are disposed in a single zigzag line passing the four electrodes along the lamination direction,
wherein six internal electrodes sequentially disposed in the lamination direction form one block, and the block is repeatedly laminated, and
the respective internal electrodes further comprise a single lead extended to the top surface and connected to a corresponding external electrode.

6. The multilayer chip capacitor of claim 5, wherein the external electrodes having different polarities are alternately disposed on each of the top surface and bottom surface,
the leads extended to the top surface and bottom surface are disposed in a zigzag arrangement on each of the top surface and bottom surface.

7. The multilayer chip capacitor of claim 6, wherein the number of the external electrodes formed on the top surface is identical to the number of the external electrodes formed on the bottom surface, and
the external electrodes having different polarities are disposed to be opposite to each other on the top surface and bottom surface.

8. The multilayer chip capacitor of claim 5, wherein internal electrodes of the same polarity among the internal electrodes are divided into an upper electrode plate and a lower electrode plate in the same plane.

9. The multilayer chip capacitor of claim 8, wherein the upper and lower electrode plates obtained by dividing the same plane have a uniform area to each other.

10. The multilayer chip capacitor of claim 8, wherein the upper and lower electrode plates obtained by dividing the same plane have a different area from each other.

11. The multilayer chip capacitor of claim 5, wherein the respective internal electrodes are divided into upper and lower electrode plates in the same plane.

12. A multilayer chip capacitor comprising:
a capacitor body formed of a lamination of a plurality, of dielectric layers and having a bottom surface that is a mounting area;
a plurality of internal electrodes disposed to be opposite to each other, interposing a dielectric layer therebetween in the capacitor body and having a single lead extended to the bottom surface, respectively; and
three or more external electrodes formed on the bottom surface and connected to corresponding internal electrodes via the leads,
wherein the internal electrodes are vertically disposed on the bottom surface, and
the leads of the internal electrodes having a different polarity from each other, adjacent to each other in a lamination direction, are disposed to be always adjacent to each other in a horizontal direction,
the external electrodes having different polarizes are alternately disposed on the bottom surface,
all of the lead extended to the bottom surface are disposed, in a single zigzag line passing the three or more external electrodes along the lamination direction,
wherein the capacitor is an 8-terminal capacitor, and
six internal electrodes consecutively disposed in the lamination direction form one block and the block is repeatedly laminated.

13. The multilayer chip capacitor of claim 12, wherein first to fourth external electrodes are sequentially disposed on the bottom surface and fifth to eighth external electrodes are sequentially disposed on the top surface,
each block comprises first to fourth internal electrodes comprising one lead extended to the bottom surface and one lead extended to the top surface,
the leads of the first to fourth internal electrodes, extended to the bottom surface, are connected to the first to fourth external electrodes, respectively, and
the first to fourth internal electrodes are consecutively laminated in an order of 1st, 2nd, 3rd, 4th, 3rd, and 2nd internal electrodes in the each block.

14. The multilayer chip capacitor of claim 13, wherein the internal electrodes are sequentially connected to 5th, 6th, 7th, 8th, 7th, and 6th external electrodes and such a connection structure of the inner and external electrodes is repeated.

15. A multilayer chip capacitor comprising:
a capacitor body formed of a lamination of a plurality of dielectric layers and having a top surface and a bottom surface that is a mounting area;
a plurality of internal electrodes disposed to be opposite to each other, interposing a dielectric layer therebetween in the capacitor body and having a single lead extended to the bottom surface, respectively; and
three or more external electrodes formed on the bottom surface and connected to corresponding internal electrodes via the leads,
three or more external electrodes formed on a top surface of the capacitor body,
wherein the internal electrodes are vertically disposed on the top surface or the bottom surface,
the leads of the internal electrodes having a different polarity from each other, adjacent to each other in a lamination direction, are disposed to be always adjacent to each other in a horizontal direction,
the external electrodes having different polarities are alternately disposed on the bottom surface, and
all of the leads extended to the bottom surface are disposed in a single zigzag line passing the three or more external electrodes along the lamination direction,
wherein the multilayer chip capacitor is an 8-terminal capacitor having four external electrodes disposed on the bottom surface and four external electrodes disposed on the top surface, in which first to sixth internal electrodes sequentially disposed in the lamination direction form one block and the block is repeatedly laminated.

16. The multilayer chip capacitor of claim 15, wherein first to fourth external electrodes are sequentially disposed on the bottom surface and fifth to eighth external electrodes are sequentially disposed on the top surface, each of the first to sixth internal electrodes has a single lead extended to the bottom surface and a single lead extended to the top surface, the leads of the fist to fourth internal electrodes extended to the bottom surface are disposed to be connected to the first to fourth external electrodes, respectively, the lead of the fifth internal electrode extended to the bottom surface is disposed to be connected to the third external electrode, and the lead of the sixth external electrode extended to the bottom is disposed to be connected to the second external electrode, and the leads extended to the top surface are disposed in a zigzag arrangement in the lamination direction between the fifth external electrode and eighth external electrode, and each lead extended to the top surface is offset by a distance between adjacent external electrodes, from the lead of the same internal electrode extended to the bottom surface.

* * * * *